United States Patent
Defoy et al.

(10) Patent No.: US 8,070,216 B2
(45) Date of Patent: Dec. 6, 2011

(54) VEHICLE FRAME WITH STRESS RELIEF FEATURE

(75) Inventors: Frédéric Defoy, Montreal (CA); Stéphane Gagnon, St-Joseph-du-Lac (CA)

(73) Assignee: Nova Bus, Division de Groupe Volvo Canada Inc., Saint-Eustache (CA)

( * ) Notice: Subject to any disclaimer, the term of this patent is extended or adjusted under 35 U.S.C. 154(b) by 39 days.

(21) Appl. No.: 12/056,327

(22) Filed: Mar. 27, 2008

(65) Prior Publication Data

US 2009/0243270 A1    Oct. 1, 2009

(51) Int. Cl.
B62D 25/24    (2006.01)
B62D 27/02    (2006.01)

(52) U.S. Cl. .............. 296/193.01; 296/205; 296/29; 296/30

(58) Field of Classification Search .......... 296/178, 296/181.1, 187.01, 193.01, 193.06, 205, 296/29, 30; 180/89.1
See application file for complete search history.

(56) References Cited

U.S. PATENT DOCUMENTS

| | | | | |
|---|---|---|---|---|
| 1,868,263 A | * | 7/1932 | Weymann | 296/203.01 |
| 3,881,765 A | * | 5/1975 | Cerra et al. | 296/178 |
| 4,254,987 A | * | 3/1981 | Leonardis | 296/178 |
| 4,358,914 A | * | 11/1982 | Geyer | 52/643 |
| 4,773,701 A | * | 9/1988 | Messori | 296/178 |
| 4,900,083 A | * | 2/1990 | Kumasaka et al. | 296/193.04 |
| 5,332,281 A | | 7/1994 | Janotik et al. | |
| 5,549,352 A | * | 8/1996 | Janotik et al. | 296/209 |
| 5,787,645 A | * | 8/1998 | Heim et al. | 49/502 |
| 6,623,067 B2 | * | 9/2003 | Gabbianelli et al. | 296/205 |
| 6,685,254 B2 | * | 2/2004 | Emmons et al. | 296/178 |
| 7,097,232 B2 | * | 8/2006 | Beaudry et al. | 296/178 |
| 2008/0001437 A1 | | 1/2008 | Balzer et al. | |

FOREIGN PATENT DOCUMENTS

| | | |
|---|---|---|
| EP | 1683710 | 7/2006 |
| GB | 1302659 | 1/1973 |

* cited by examiner

*Primary Examiner* — Glenn Dayoan
*Assistant Examiner* — Sunsurraye Westbrook
(74) *Attorney, Agent, or Firm* — Norton Rose OR LLP

(57) ABSTRACT

A vehicle frame includes a plurality of hollow tubular members welded together. An opening in a side wall of the frame which receives a door or window of the vehicle is bordered by at least two hollow tubular members which are interconnected by a non-tubular, reinforcing corner member. The reinforcing corner member includes a pair of solid parallel plates spaced apart by a perpendicular cross-member. Each plate of the reinforcing corner member has integral first and second elongated portions extending on either side of a continuous curve therebetween which has a substantially constant radius of curvature such as to define a smooth transition between the integral first and second elongated portions of the plate. The reinforcing corner member distributes stress away from the curved corner and to the tubular members, thereby preventing stress concentration at a joint between the two tubular members surrounding the opening in the frame.

18 Claims, 6 Drawing Sheets

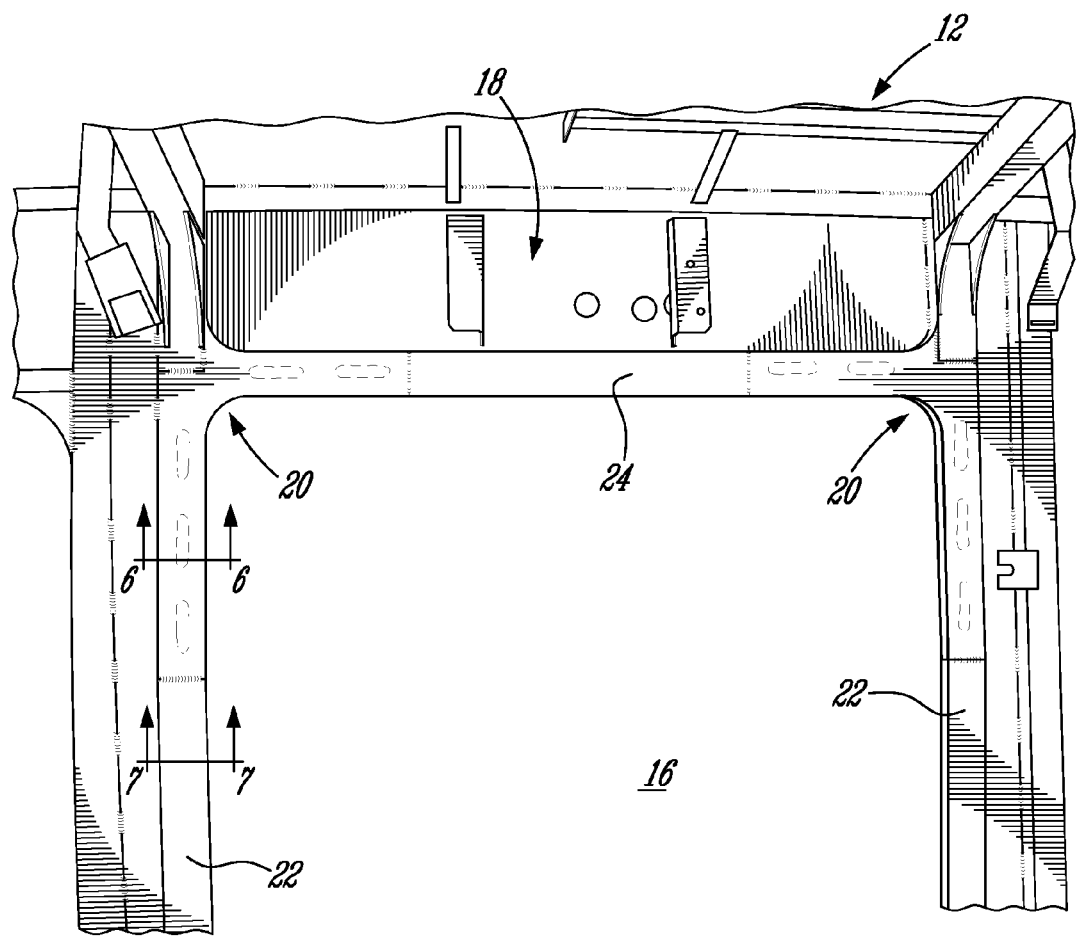
FIG_3

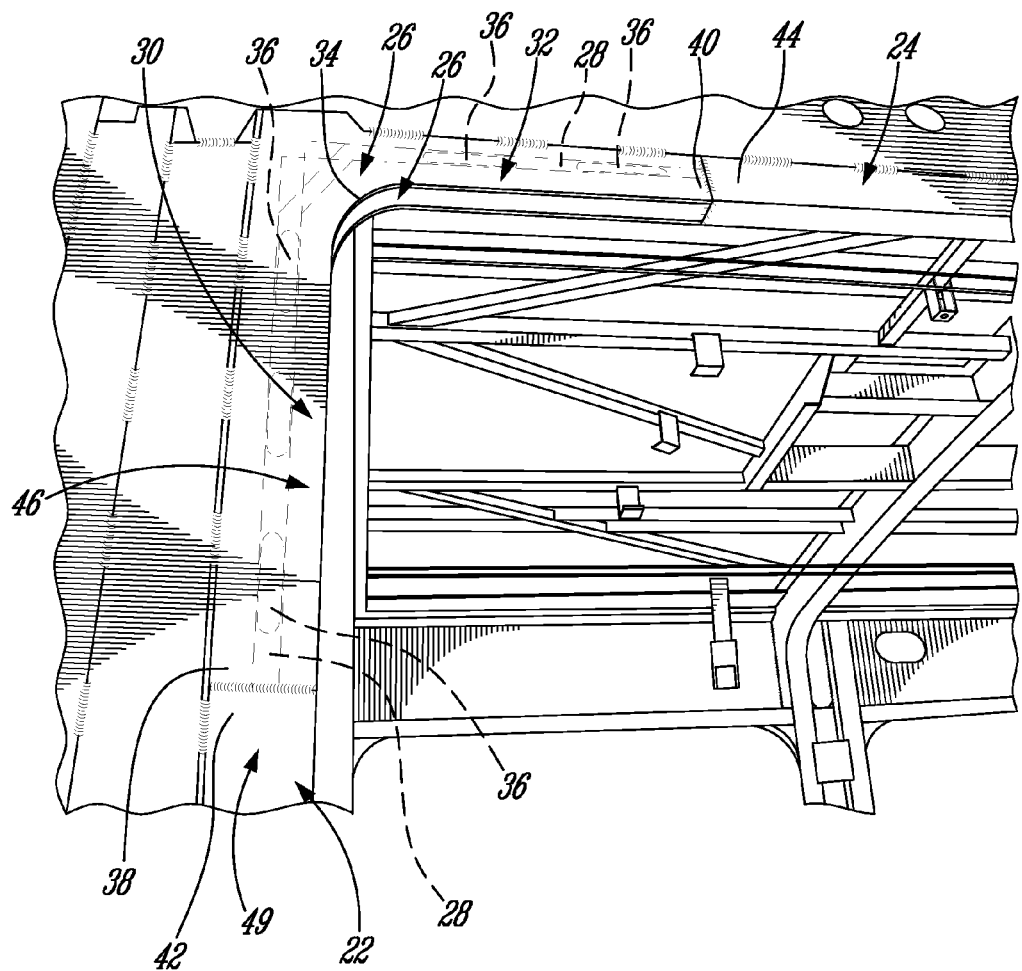
FIG_4

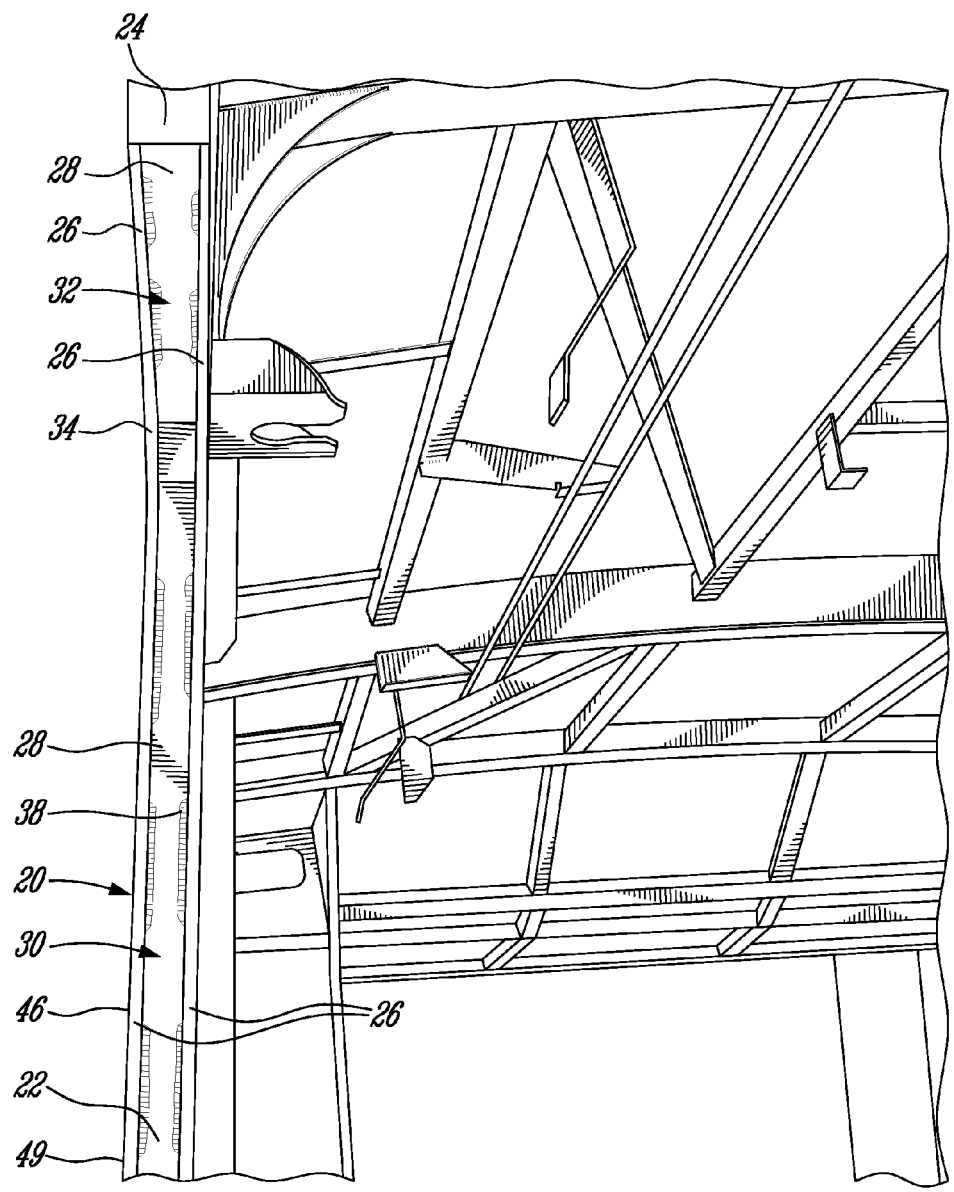
FIG_5

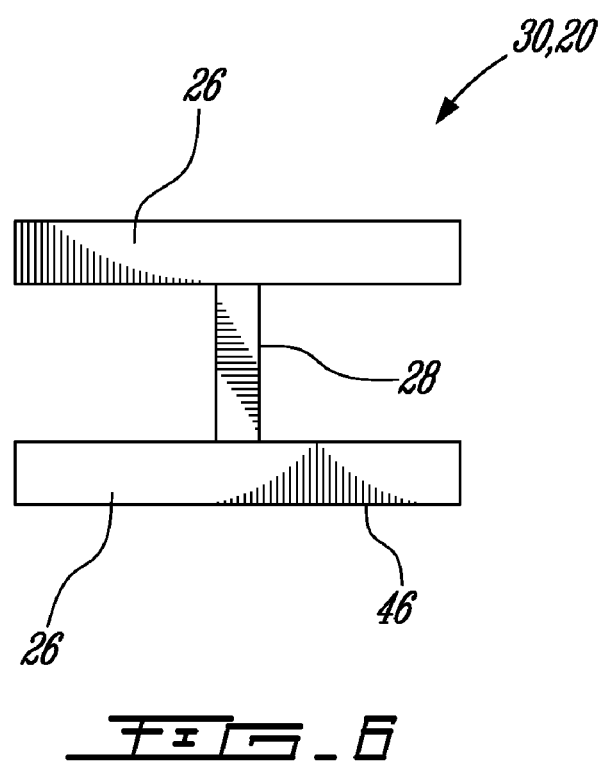
FIG_6
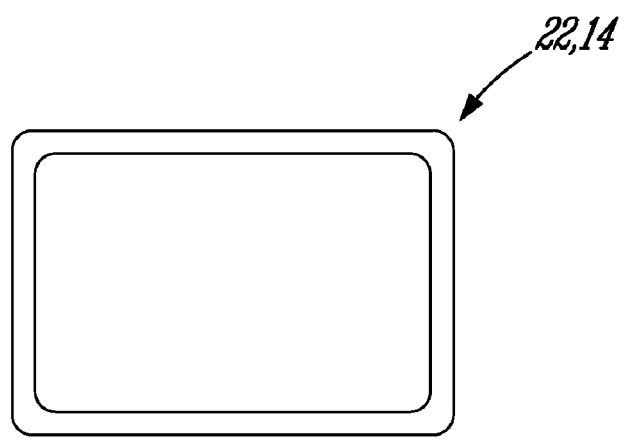
FIG_7

VEHICLE FRAME WITH STRESS RELIEF FEATURE

TECHNICAL FIELD

The present invention relates generally to structures of large road vehicles such as buses, recreational vehicles, and the like. More particularly, the present invention relates to a chassis frame for such a road vehicle.

BACKGROUND OF THE INVENTION

Many road-going vehicles, particularly larger industrial and/or commercial vehicles such as buses, trucks, recreational vehicles and the like, are manufactured using a chassis which includes an internal space frame or skeleton upon which the outer body structure is subsequently installed. This frame is typically composed of a plurality of tubular structural members which are interconnected by welding, riveting, bolting, etc, such as to produce the frame structure of the vehicle. These tubular members are most often hollow tubes having a circular, square or rectangular cross-sectional shape.

Public transportation vehicles such as buses are expected to survive for extremely long life cycle periods, during which time the vehicle, and therefore its internal frame, is exposed to high stresses and very high mileage. As such, the welded joints formed between the interconnected tubular members of the vehicle's frame are particularly exposed high stresses and repeated fatigue forces, and it is at these joints where concentration of stresses occur. Therefore, it is the joints themselves between the tubular members which are prone to potential weakening, leading eventually to failure of the joints in areas of the frame which are exposed to the greatest concentration of stresses. Adjacent tubes which meet at right angles and are butt welded together are often particularly prone to such high stress concentration at the welded joint therebetween.

However, such right angle joints between tubes are unavoidable in the frame structure of a bus, given that relatively large openings between tubes of the frame must remain free of reinforcement structure, which openings are adapted for receiving windows or doors of the vehicle therein. As such the welded joints between those tubes which are fastened together around such large openings, i.e. the joints which fasten together the tubes which form the window or door frame, are particularly exposed to stress concentrations and are therefore particularly prone to weakening, damage and/or failure given sufficient forces for a sufficiently long period of time.

Attempts to reinforce certain regions of such tubular vehicle frames have been made, for example by providing reinforcement gussets between adjacent welded tubes. However, the added strength provided by this simple gusset reinforcement has not proved to be sufficient. Alternately, other means of improving the strength of such structures and therefore minimizing the effects of stresses thereof have been attempted, such as by using larger diameter tubes or by simply attempting to avoid butt welded joints between tubes which are oriented perpendicularly to each other. However, penalties exists which all of these attempted methods, including weight and cost penalties, while nevertheless failing to provide a significant increase in strength. Generally, designers of such commercial road vehicles are reluctant to move away from using hollow tubular frame members having a rectangular or square cross-sectional profile, as such tubes typically provide good strength to weight ratios, while being relatively inexpensive to manufacture and relatively easy to assemble and weld together.

It would therefore be desirable to be able to improve the overall strength of a tubular frame structure for a bus or other large road vehicle, and more particularly to be able to improve the strength of joints between tubes in certain regions of such tubular frames, by reducing the stress to which such regions and/or joints are exposed during operation of the vehicle.

SUMMARY OF THE INVENTION

It is an object of the present invention to provide an improved vehicle structure having features which reduce the likelihood of stress induced damage, as well as a method of manufacturing such a vehicle structure.

In accordance with one aspect of the present invention, there is provided a frame for a vehicle comprising a plurality of hollow tubular members welded together and defining at least substantially vertical sides walls of the frame; an opening defined in at least one of the side walls of the frame for receiving at least one of a door and a window of the vehicle therein, the opening being bordered by at least two of said hollow tubular members; a non-tubular reinforcing corner member disposed between said at least two of said hollow tubular members, said reinforcing corner member including a pair of solid plates disposed parallel to each other and being spaced apart by at least one cross-member disposed between said plates and oriented perpendicularly thereto, each plate of the reinforcing corner member having integral first and second elongated portions thereof disposed on either side of a continuous curve therebetween, the curve in said plate having a substantially constant radius of curvature such as to define a smooth transition between the integral first and second elongated portions of the plate; wherein the reinforcing corner member distributes stress away from the curved corner and to the tubular members, such as to prevent stress concentration at a joint between the at least two tubular members surrounding said opening in the frame.

There is also provided, in accordance with another aspect of the present invention, a bus comprising a chassis with a structurally load bearing frame, the frame having a plurality of hollow tubular members welded together and defining at least substantially vertical sides walls of the frame; an opening defined in at least one of the side walls of the frame for receiving at least one of a door and a window of the vehicle therein, the opening being bordered by at least two of said hollow tubular members; a non-tubular reinforcing corner member disposed between said at least two of said hollow tubular members, said reinforcing corner member including a pair of solid plates disposed parallel to each other and being spaced apart by at least one cross-member disposed between said plates and oriented perpendicularly thereto, each plate of the reinforcing corner member having integral first and second elongated portions thereof disposed on either side of a continuous curve therebetween, the curve in said plate having a substantially constant radius of curvature such as to define a smooth transition between the integral first and second elongated portions of the plate; wherein the reinforcing corner member distributes stress away from the curved corner and to the tubular members, such as to prevent stress concentration at a joint between the at least two tubular members surrounding said opening in the frame.

There is also provided, in accordance with another aspect of the present invention, a method of reinforcing a tubular frame for a vehicle, the tubular frame including a plurality of enclosed tubes fastened together to form said tubular frame, the method comprising: identifying a joint at a corner defined between at least two of said tubes, said joint having an expected stress level during operation of the vehicle that is greater than a predetermined maximum desirable level; ensuring that a gap exists between said at least two of said tubes at said corner therebetween; and fastening a non-tubular reinforcing corner member in place between said at least two of said tubes, said reinforcing corner member including a pair of parallel and spaced apart plates joined by at least one cross-member disposed between said plates and oriented perpendicularly thereto, each plate of the reinforcing corner member having integral first and second elongated portions thereof extending on either side of a curved inner corner therebetween, the curved inner corner being substantially continuous and having a substantially constant radius of curvature, such as to define a smooth transition between the integral first and second elongated portions of the plate, the reinforcing corner member ensuring that stress generated therein during operation of the vehicle is distributed therethrough and transmitted to said at least two of said tubes of the tubular frame without causing a stress concentration at the corner between said at least two of said tubes, such as to maintain said expected stress level at said corner below said predetermined maximum desirable level.

There is further provided, in accordance with an alternate aspect of the present invention, a method of retrofitting a vehicle chassis having a tubular frame in order to improve the stiffness thereof, the tubular frame including a plurality of enclosed tubular members fastened together at a plurality of welded joints to form said tubular frame, the method comprising: identifying at least one of said welded joints having a stress concentration level greater than a predetermined maximum desirable level; cutting at least a portion of two of said tubular members on each side of said identified welded joint between the two of said tubular members; removing a corner of said frame including the cut portion of said two tubular members and the identified welded joint therebetween; replacing said corner by a non-tubular reinforcing corner member, said reinforcing corner member including a pair of parallel and spaced apart plates joined by at least one cross-member disposed between said plates and oriented perpendicularly thereto, each plate of the reinforcing corner member having integral first and second portions thereof extending on either side of a curved inner corner therebetween, the curved inner corner being substantially continuous such as to define a smooth transition between the integral first and second portions of the plate; abutting each end of the first and second portions of the plates of said reinforcing corner member against an adjacent one of the two tubular members at said cut formed therein, and aligning an outwardly facing surface of each of said plates with an outer surface of said adjacent ones of the tubular members such that the outwardly facing surface and the outer surface are coplanar; and fastening said ends of the first and second portions of the plates of said reinforcing corner member to the respective adjacent tubular members.

BRIEF DESCRIPTION OF THE DRAWINGS

Further features and advantages of the present invention will become apparent from the following detailed description, taken in combination with the appended drawings, in which:

FIG. 3 is an rear perspective view of the side wall portion of the tubular frame of FIG. 2;

FIG. 4 is an enlarged perspective view of the reinforcing corner members of FIG. 2;

FIG. 5 is an inner side view of the reinforcing corner member of FIG. 4;

FIG. 6 is a cross-sectional view taken through the line 6-6 of FIG. 3; and FIG. 7 is a cross-sectional view taken through the line 7-7 of FIG. 3.

DETAILED DESCRIPTION OF A PREFERRED EMBODIMENT

Figure 1:
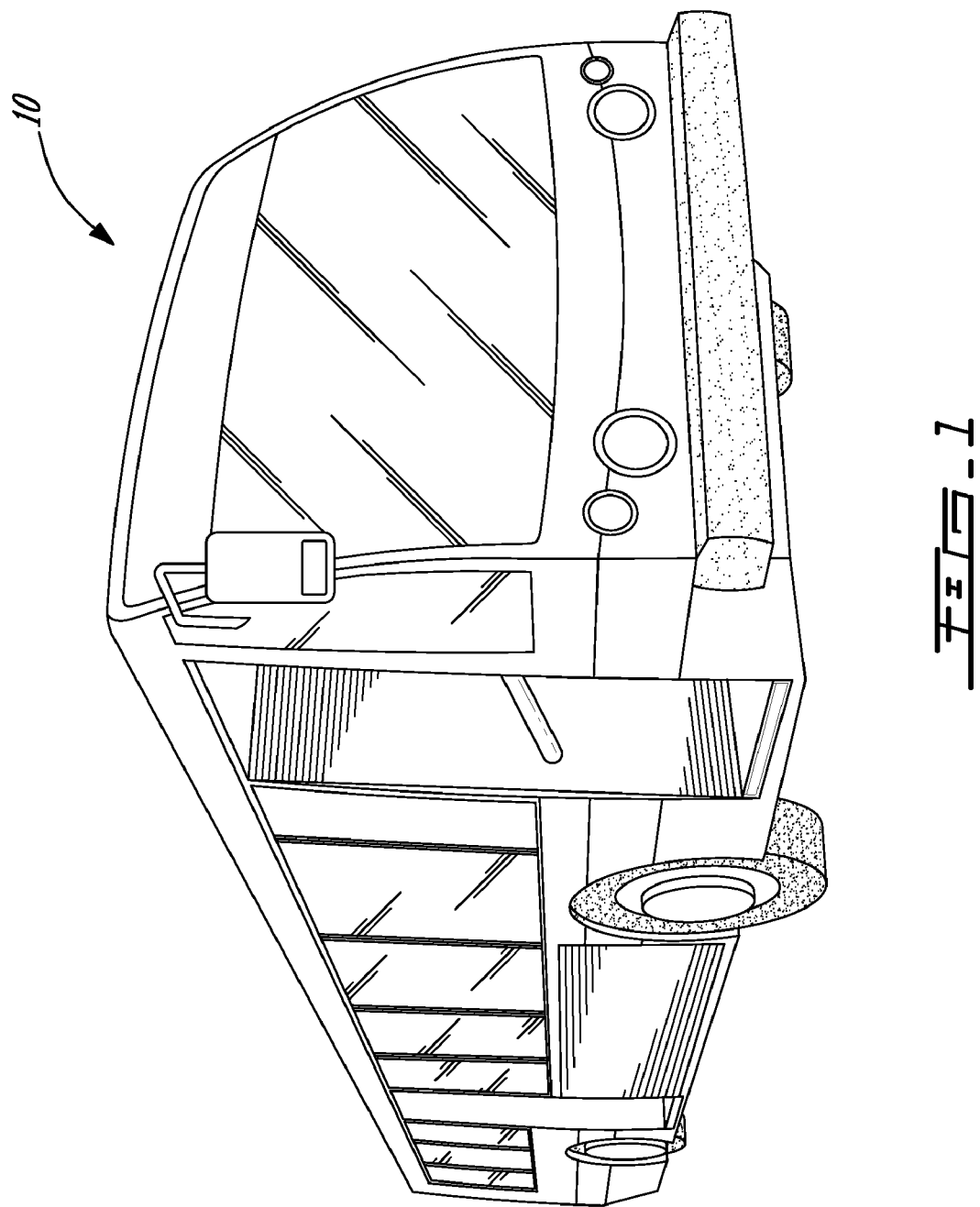
FIG. 1 is a perspective view of a bus.

As seen in FIG. 1, a bus 10 of the type used for public transportation is provided which is composed of an internal chassis that includes a superstructure or space frame upon which the outer body structure is installed. Although the present invention will be described herewith with particular respect to its use in a bus, it is to be understood that it can be applied and used in any large vehicle having a space frame construction, including both road going vehicles such as trucks, buses, recreational vehicles, as well as other public transportation vehicles such as subway cars, train cars, light rail cars, etc.

Figure 2:
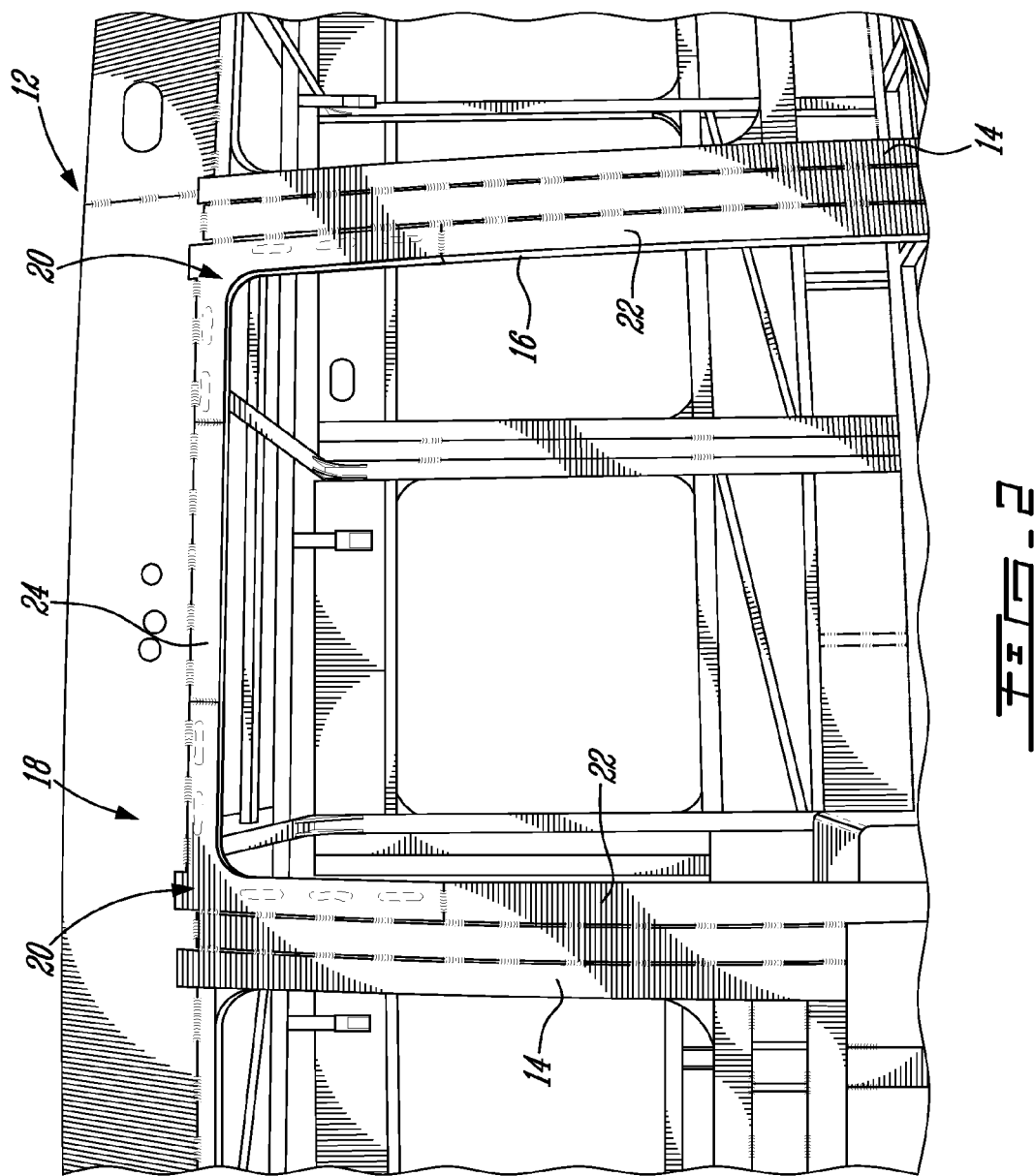
FIG. 2 is a front perspective view of a side wall portion of a tubular frame for a bus, including a window opening circumscribed by tubes which make up the window frame and reinforcing corner members disposed between each of the window frame tubes.

Referring to FIGS. 2 and 3, a frame 12 of the body of the vehicle 10 is made up of a plurality of individual hollow tubular members 14 which are interconnected and fastened together such as to form said frame assembly 12. Generally, these tubular members (or tubes) are fastened together by welding, although other fastening means, such as riveting, bolting, etc., are possible. As best seen in FIG. 7, the hollow tubular members 14 preferably define a substantially rectangular cross-sectional shape, although other profiles may also be used, such as tubes having a square or circular cross-sectional shape for example. The frame 12 of such vehicles 10 must necessarily include large openings 16 therein, particularly in the side walls 18 of these frame structures 12, within which doors and/or windows of the vehicle are received.

As seen in FIGS. 2 and 3, the tubular members 14 of the frame 12 include a pair of substantially vertically extending side tubes 22 and a substantially horizontally extending top tube 24 which together at least partially circumscribe and enclose an opening 16 defined in the side wall 18 of the vehicle frame 12. Rather than the side and top tubes 22, 24 which make up the window or door frame being welded together at T-joints, as is typically done which such perpendicularly oriented tubes, the present frame 12 includes a reinforcing corner member 20 disposed at least corner of the opening, between each of the side tubes 22 and the top tube 24. Thus, the use of welded T-joints between perpendicularly oriented side tubes 22 and top tube 24 tubes 14 about the periphery of the opening 16 is avoided. As will be described further below, reinforcing corner member 20 provides a means of relieving stress at the junction between these window/door frame tubes and thereby reduces the chances of wear, weakening and/or failure of the joint therebetween.

Referring to FIGS. 4-6 showing the reinforcing corner member 20 in greater detail, each reinforcing corner member 20 is non-tubular in cross-sectional profile/shape, and is made up of a pair of solid plates 26 disposed parallel to each other and with a plane within which the at least three window frame tubes 22, 24 lie. The two parallel solid plates 26 are laterally separated by at least one central cross-member 28 which extends both vertically and horizontally and is made up of a narrow plate that is oriented perpendicularly to the two main parallel plates 26 between which it extends. As such, and as best seen in FIG. 6, the two parallel plates 26 and the central cross-member 28 form a I-beam type construction for the reinforcing corner member 20. The central cross-member 28 is, in the present embodiment, formed separately from the two main plates 26, and is welded at discrete weld points 36 along the length of each of first and second branches or portions 30, 32 of the L-shaped assembly disposed on either side of a central corner 34 therebetween. It is however to be understood that the central cross-member 28 may be welded to each of the plates 26 along a full length of the cross-member, rather than merely at certain discrete weld points therebetween.

Each of the plates 26 of the reinforcing corner member 20 are, in at least this embodiment, substantially L-shaped and therefore define the first portion 30 and the second portion 32 which are integral with each other (i.e. made of the same solid plate) and which are disposed at substantially 90 degrees from each other on either side of the corner 34. In at least one embodiment, the corner 34 has a substantially constant radius of curvature, such that it is substantially continuous and therefore provides a smooth transition between the integral first and second portions 30, 32 of each of the L-shaped plates 26. This smoothly curved corner 34 helps to evenly distribute any stress throughout the entire reinforcing corner member 20, and therefore reduces the likelihood of a stress concentration building up at any one welded joint. In other words, this configuration of the reinforcing corner member 20 permits equal stress distribution and therefore provides stress relief to individual welded joints as the load is distributed through the corner member 20 rather than being concentrated solely at a single T-joint, as per the welded corner joints of the prior art.

Each remote end of the first and second portions 30, 32 are abutted end-to-end with respective ends of the vertical and horizontal window frame tubes 22, 24, and fastened thereto by a butt weld. Specifically, the remote end 38 of the first portion 30 of each plate is butt welded to the upper end 42 of the vertically extending fame tubes 22, while the remote end 40 of the second portion 32 of each plate is butt welded to an outer end 44 of the horizontally extending frame tube 24. Preferably, this is done such that an outwardly facing surface 46 of each of the plates 26 is substantially aligned and coplanar with an outer surface 49 of the adjacent one of the frame tubes 22, 24. Or, alternately stated, the outer periphery of both the rectangular tubes 22, 24 is, in at least the present embodiment, the same size and shape as that of the I-beam shaped portions 30, 32 of the reinforcing corner member 20 which is disposed therebetween.

While the parallel plate configuration and structure of the reinforcing corner member 20 is particularly strong when disposed in the corner regions linking two tubular members 14 disposed at an angle, whether 90 degrees or otherwise, relative to each other, it is less strong in a transverse direction (i.e. transverse to the fore-aft length of the frame assembly which makes up the vehicle body), and therefore it would not be desirable to build the entire frame superstructure out of such a configuration rather than using traditional tubes for a majority of the frame 12. The reinforcing corner members 20 are intended to provide specific reinforcement and stress relief in targeted regions of the frame which are expected to be exposed to high levels of stress in the welded joints between the tubular members 14. The continuous and gradual curve 34 formed in the parallel plates 26, and the fact that these plates 26 are aligned in parallel to the main axes of force exerted at the corner joint between two substantially perpendicular tubes, permits an improved stress distribution such as to prevent any excessive stress concentrations at the joints between the frame's tubes.

As seen in FIGS. 2 and 3, the opening 26 defined in the side wall 18 of the vehicle's frame 12 is preferably with at least two of the reinforcing corner members 20, one between each of the upstanding frame tubes 22 and the horizontal top tube 24 which enclose the opening 16. It is understood that if the opening 16 is to be used for receiving a window of the vehicle therein, two more reinforcing corner members 20 may be provided at the opposed lower corners of the window opening. If however the opening 16 is to be used to receive a door of the vehicle therein, the upstanding frame tubes 22 may simple be welded or otherwise fastened to base tube members of the frame, without the need for additional such reinforcing corner members.

The vehicle frame 12 may be initially manufactured with the reinforcing corner members 20 as described above. When the reinforcing corner members 20 are designed and built into the frame structure 12 from its conception, those corner locations within the structure which are expected to exposed to localized high stress concentrations may be predetermined such that the reinforcing corner members 20 can be provided within these locations. This may be done by first designing a layout of the tubular members which are to form the frame structure, and the identifying one or more potential joint at a corner defined between at least two of the tubular members at which an expected stress concentration level in the joint would be greater than a predetermined maximum desirable level. Once these potential joints have been identified, the tubular frame can be built by welding the plurality of tubular members to together butt without fastening the identified two tubes together in a standard T-joint corner and ensuring that a gap exists between these two tubes which is sufficient to receive one of the reinforcing corner members 20 therein. The non-tubular reinforcing corner member 20 can then be positioned in place and fastened to the two tubes, thereby providing an improved corner portion between the two tubes that will better distribute the stress to which the corner joint is exposed and therefore ensure a longer lifespan to the frame structure.

Alternately, however, an existing vehicle frame may be retrofitted (such as during a repair and overall period) in order to add such reinforcing structural members 20 at those corner locations within the frame structure which are determined to be either already in need of such reinforcement and stress relief (for example which demonstrate signs of weakening or damaged welded joints) or which are expected to continue to be exposed to localized stress concentrations and therefore which may be expected to be weakened or damaged in the future. For example, this may be accomplished by first identifying at least one welded joint between two tubular members of the frame having a stress concentration level during operation of the vehicle which is greater than a predetermined maximum acceptable or desirable level. At least a portion of the two tubular members is then cut on either side of the identified welded joint, and then the corner formed between the two tubular members, including the welded joint, is removed. In its place, a reinforcing corner member 20 as described above is inserted in position between the two tubular members. The remote ends 38, 40 of the reinforcing corner members 20 are then butt welded to the respective cut ends of the two tubular members. Accordingly, the welded joint between the two tubular members which is either damaged or identified as being susceptible to future damage is thereby cut out, removed and replaced with the much stronger reinforcing corner member 20, which allows for significantly improved stress distribution such that stress concentrations do not occur at any one welded joint of the corner.

The embodiments of the invention described above are intended to be exemplary. Those skilled in the art will therefore appreciate that the forgoing description is illustrative only, and that various alternatives and modifications can be devised without departing from the spirit of the present invention. Accordingly, the present is intended to embrace all such alternatives, modifications and variances which fall within the scope of the appended claims.

The invention claimed is:

1. A frame for a vehicle comprising a plurality of closed-perimeter hollow tubular members welded together and defining at least substantially vertical sides walls of the frame; an opening defined in at least one of the side walls of the frame for receiving at least one of a door and a window of the vehicle therein, the opening being bordered by at least two of said hollow tubular members disposed substantially perpendicularly to each other with first remote ends thereof being spaced apart from one another on either side of a corner region of the opening, said at least two hollow tubular members defining a substantially vertical plane within which they lie; a non-tubular reinforcing corner member interconnecting the first remote ends of said two hollow tubular members such that only the non-tubular reinforcing corner member is disposed between said first remote ends of the two hollow tubular members within said corner region, the non-tubular reinforcing corner member having perpendicularly oriented ends which are abutted end-to-end with respective ones of the first remote ends of said at least two of said hollow tubular members, said reinforcing corner member including a pair of solid plates disposed parallel to each other and being spaced apart by at least one cross-member disposed between said plates and oriented perpendicularly thereto, said plates being substantially parallel to the plane defined by the hollow tubular members, each plate of the reinforcing corner member having integral first and second elongated portions thereof disposed on either side of a continuous curve therebetween, the curve in said plate having a substantially constant radius of curvature such as to define a smooth transition between the integral first and second elongated portions of the plate; wherein the reinforcing corner member distributes stress away from the curved corner and to the tubular members, such as to prevent stress concentration at a joint between the at least two tubular members surrounding said opening in the frame.

2. The frame as defined in claim 1, wherein the plates of the reinforcing corner member are substantially L-shaped, an angle of approximately 90 degrees being defined between the integral first and second elongated portions thereof.

3. The frame as defined in claim 1, wherein the hollow tubular members have a substantially rectangular cross-sectional shape.

4. The frame as defined in claim 1, wherein said at least two tubular members include three tubular members surrounding at least an upper portion of said opening, the three tubular members include a substantially horizontal top tube and two substantially vertical side tubes all disposed in said plane defining said side wall of the frame.

5. The frame as defined in claim 1, wherein an outwardly facing surface of each of said plates of the reinforcing corner member is coplanar with an outer surface of the adjacent one of said at least two tubular members between which the reinforcing corner member is disposed.

6. The frame as defined in claim 1, wherein each end of the first and second portions of the reinforcing corner member is butt welded to the first end of an adjacent one of the at least two of said hollow tubular members.

7. A bus comprising a chassis with a structurally load bearing frame, the frame having a plurality of closed-perimeter hollow tubular members welded together and defining at least substantially vertical sides walls of the frame; an opening defined in at least one of the side walls of the frame for receiving at least one of a door and a window of the vehicle therein, the opening being bordered by at least two of said hollow tubular members disposed substantially perpendicularly to each other without being in contact, with first ends of the hollow tubular members being spaced apart from one another, said at least two hollow tubular members defining a substantially vertical plane within which they lie; wherein solely a non-tubular reinforcing corner member is disposed between the first ends of said two hollow tubular members such as to interconnect said first ends, the non-tubular reinforcing corner member has a first end abutted end-to-end with the first end of a first one of said two hollow tubular members and a second end abutted end-to-end with the first end of a second one of said two hollow tubular members, said reinforcing corner member including a pair of solid plates disposed parallel to each other and being spaced apart by at least one cross-member disposed between said plates and oriented perpendicularly thereto, said plates being substantially parallel to the plane defined by the hollow tubular members, each plate of the reinforcing corner member having integral first and second elongated portions thereof disposed on either side of a continuous curve therebetween, the curve in said plate having a substantially constant radius of curvature such as to define a smooth transition between the integral first and second elongated portions of the plate;
  wherein the reinforcing corner member distributes stress away from the curved corner and to the tubular members, such as to prevent stress concentration at a joint between the at least two tubular members surrounding said opening in the frame.

8. The bus as defined in claim 7, wherein the plates of the reinforcing corner member are substantially L-shaped, an angle of approximately 90 degrees being defined between the integral first and second elongated portions thereof.

9. The bus as defined in claim 7, wherein the hollow tubular members have a substantially rectangular cross-sectional shape.

10. The bus as defined in claim 7, wherein said at least two tubular members include three tubular members surrounding at least an upper portion of said opening, the three tubular members include a substantially horizontal top tube and two substantially vertical side tubes all disposed in said plane defining said side wall of the frame.

11. The bus as defined in claim 7, wherein an outwardly facing surface of each of said plates of the reinforcing corner member is coplanar with an outer surface of the adjacent one of said at least two tubular members between which the reinforcing corner member is disposed.

12. The bus as defined in claim 7, wherein each end of the first and second portions of the reinforcing corner member is butt welded to the first end of an adjacent one of the at least two of said hollow tubular members.

13. A method of reinforcing a tubular frame for a vehicle, the tubular frame including a plurality of enclosed hollow tubes fastened together to form said tubular frame, the method comprising:
  identifying a joint at a corner defined between at least two of said tubes disposed substantially perpendicularly to each other and defining a substantially vertical plane within which they lie, said joint having an expected stress level during operation of the vehicle that is greater than a predetermined maximum desirable level;
  ensuring that a gap exists between adjacent terminal ends of said at least two of said tubes at said corner therebetween; and
  fastening a non-tubular reinforcing corner member in place between said two tubes, said non-tubular reinforcing corner member filling said gap and being abutted in an end-to-end relationship with said at least two of said tubes, said reinforcing corner member including a pair of parallel and spaced apart plates joined by at least one cross-member disposed between said plates and oriented perpendicularly thereto, said plates being substantially parallel to the plane defined by the hollow tubes, each plate of the reinforcing corner member having integral first and second elongated portions thereof extending on either side of a curved inner corner therebetween, the curved inner corner being substantially continuous and having a substantially constant radius of curvature, such as to define a smooth transition between the integral first and second elongated portions of the plate, the reinforcing corner member ensuring that stress generated therein during operation of the vehicle is distributed therethrough and transmitted to said at least two of said tubes of the tubular frame without causing a stress concentration at the corner between said at least two of said tubes, such as to maintain said expected stress level at said corner below said predetermined maximum desirable level.

14. The method as defined in claim 13, further comprising the step of designing a layout of said tubes such as to form said tubular frame, prior to the step of identifying.

15. The method as defined in claim 14, further comprising building said tubular frame by welding said tubes together to form said designed layout.

16. The method as defined in claim 13, wherein the step of ensuring that the gap exists between said at least two of said tubes at said corner further comprises cutting at least a portion of said at least two of said tubes on each side of said identified joint therebetween.

17. The method as defined in claim 16, further comprising removing said cut corner and replacing said cut corner with said reinforcing corner member.

18. The method as defined in claim 13, wherein the method is carried out on a complete tubular frame of an existing vehicle such as to retrofit the existing vehicle with a reinforced frame.

* * * * *